United States Patent

[11] 3,546,404

[72] Inventors Frank L. Whiteman
Elizabeth Township, Allegheny County;
William L. Zemberry, Swissvale Borough,
Pennsylvania
[21] Appl. No. 820,844
[22] Filed May 1, 1969
[45] Patented Dec. 8, 1970
[73] Assignee United States Steel Corporation
a corporation of Delaware

[54] SWITCH ACTUATED BY FLUID FLOW
7 Claims, 5 Drawing Figs.
[52] U.S. Cl. .................................................. 200/81.9,
335/205
[51] Int. Cl. .................................................. H01h 35/24
[50] Field of Search .......................................... 200/81.9,
81.9(M), 83.6; 335/205

[56] References Cited
UNITED STATES PATENTS
3,363,073   1/1968   Bouguet .................. 200/81.9(M)

Primary Examiner—Robert K. Schaefer
Assistant Examiner—M. Ginsburg
Attorney—Donald S. Ferito ABSTRACT: A pipe length disposed generally vertically has a cup on the upper end liftable by the force of fluid flow therethrough. A magnet induces flux transversely through the cup and pipe. A magnetically operated switch is mounted above the upper end of the pipe. When the cup is lifted by fluid flow, it shifts the path of the induced flux so as to cause operation of the switch.

INVENTORS.
FRANK L. WHITEMAN and
WILLIAM L. ZEMBERRY
By J. Wallace Hopkins
Attorney

SWITCH ACTUATED BY FLUID FLOW

This invention relates to a magnetic switch and means for operating it in response to fluid flow through a pipe length tube or conduit and, in particular to a switch adapted to operate on fluid flow under high pressure at low volume.

BACKGROUND OF THE INVENTION

Fluid-flow switches known previously to our invention have usually been designed to respond to high pressure and large-volume flow or low pressure at low-volume flow. Switches designed for the former cannot respond to the latter and switches sufficiently light to respond to low pressures and small-volume flow cannot withstand high pressure and large-volume flow.

SUMMARY OF THE INVENTION

In a preferred embodiment, we provide an open sided rectangular frame at the upper end of a pipe length disposed generally vertically, through which occurs the fluid flow to be indicated or determined. A cup overlies the upper end of the length and is liftable by the energy of fluid emanating therefrom. A magnet is mounted on the frame so as to induce flux through the cup and the upper end of the pipe lengths. A magnetically responsive switch is disposed above the frame. When the cup is lifted, the path of the magnetic flux is shifted to cause operation of the switch.

BRIEF DESCRIPTION OF THE DRAWINGS

A complete understanding of the invention may be obtained from the following detailed description and explanation which refer to the accompanying drawings illustrating the present preferred embodiment. In the drawings.

Figure 1:
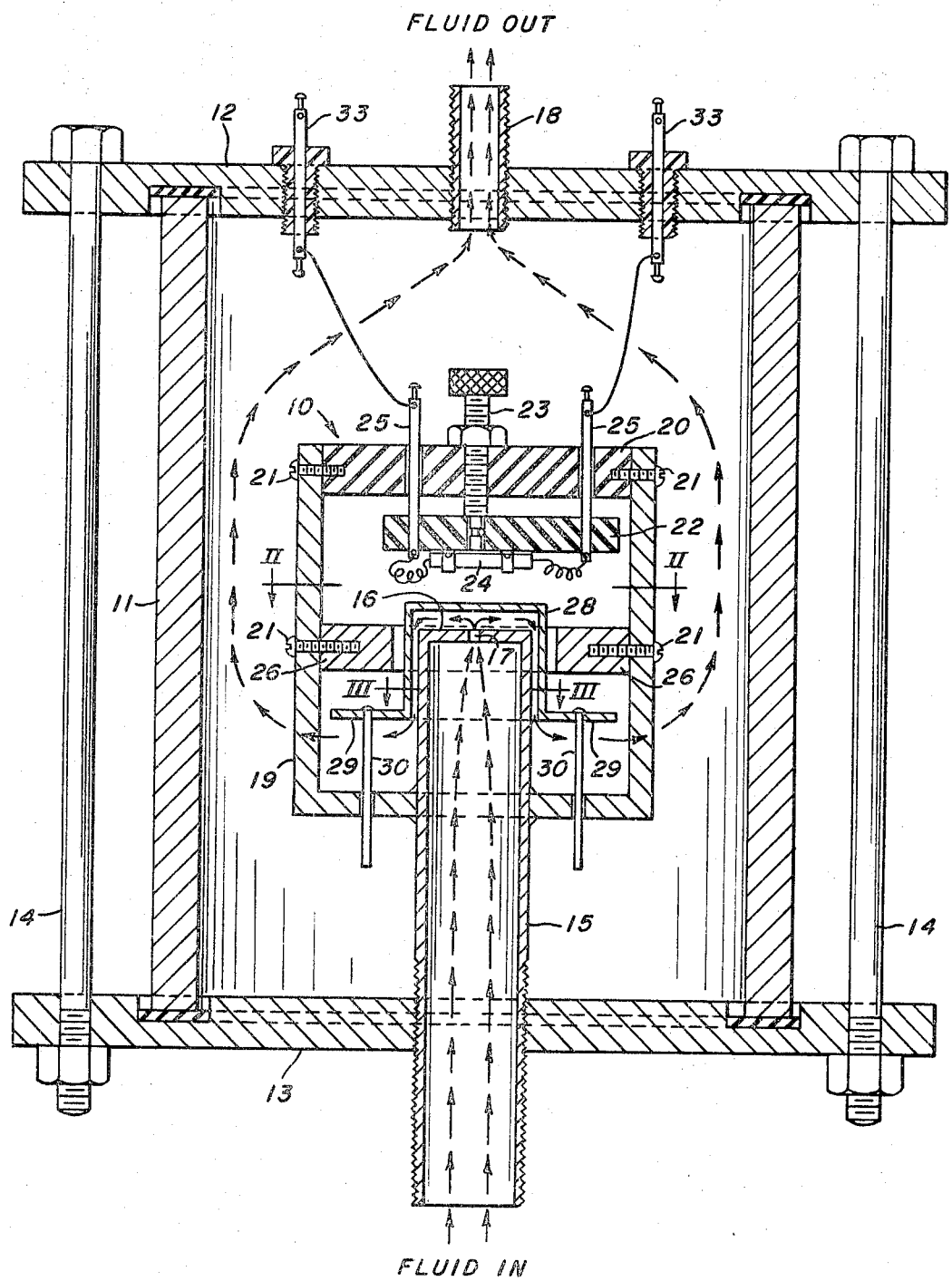
FIG. 1 is a view partly in vertical axial section through our device with parts shown in elevation.

Switch 10 includes a U-shaped supporting frame 19 through the bottom of which pipe 15 extends. A bridge bar 20 of electrical insulation connects the upper ends of the parallel limbs of frame 19, being secured thereof by screws 21. A switch plate 22 of electrical insulation is connected to the lower end of an adjusting screw 23 threaded centrally through bar 20. A reed switch 24 is secured to the lower surface of plate 22. Guide pins 25 extend upwardly from plate 22 through suitable holes in bar 20. The plate thus has guided vertical movement relative to the bar on rotation of screw 23.

Switch 24 is of the type that closes when subjected to a magnetic field therethrough and opens when the field is removed. This type of switch is a known commercial product, e.g. that made by Hamlin, Incorporated, Lake Mills, Wisconsin, and designated by it, Model MTRR-2 Reed Switch. Since this switch is known, no detailed description thereof is needed.

Figure 2:
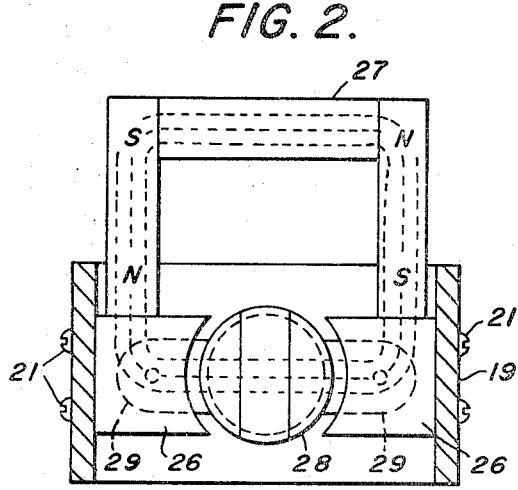
FIG. 2 is a horizontal section taken along the plane of line II-II of FIG. 1.

Pole pieces 26 (see FIGS. 1 and 2) extend inwardly toward each other and the upper end of pipe 15 from the parallel limbs of frame 19. A horse shoe magnet 27 disposed horizontally and extending laterally of frame 19 has its poles in contact with pole pieces 26. This arrangement creates a magnetic field normally extending transversely through the upper end of pipe 15.

Figure 3:
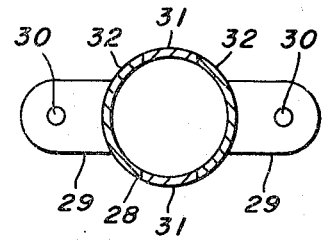
FIG. 3 is a partial horizontal section taken along the plane of line III-III of FIG. 1.
Figure 4:
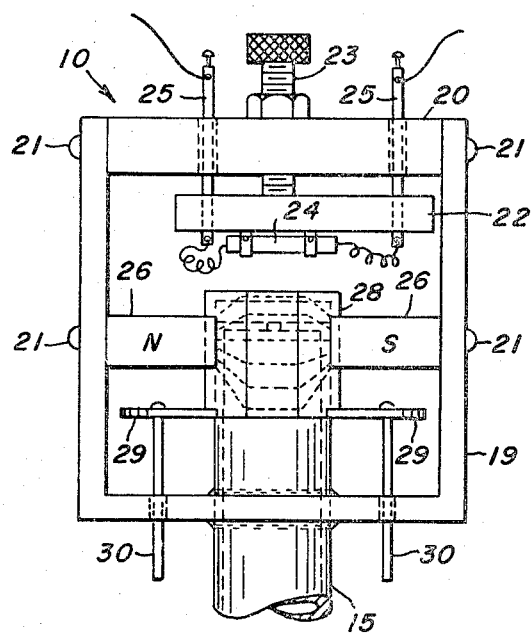
FIGS. 4 and 5 are partial elevations showing, respectively, the two extreme positions (lower and upper) of the cup relative to the upper end of the pipe length. DETAILED DESCRIPTION OF PREFERRED EMBODIMENT Referring now in detail to the drawings and, for the present, particularly to FIG. 1, our flow switch, indicated generally at 10, is mounted in a chamber comprising a cylinder 11 clamped between top and bottom plates 12 and 13, respectively, by through bolts 14. A stand pipe 15 made of nonmagnetic material threaded through bottom plate 13 is closed at the top by a blank end 16 having a central port 17 therein. The lower end of pipe 15 has connected thereto a hose or pipe line conducting the fluid, the flow of which is to be indicated by switch 10. Top plate 12 has an outlet nipple 18 threaded thereinto so the flow of fluid takes place through pipe 15, port 17 and out through nipple 18.
Figure 5:
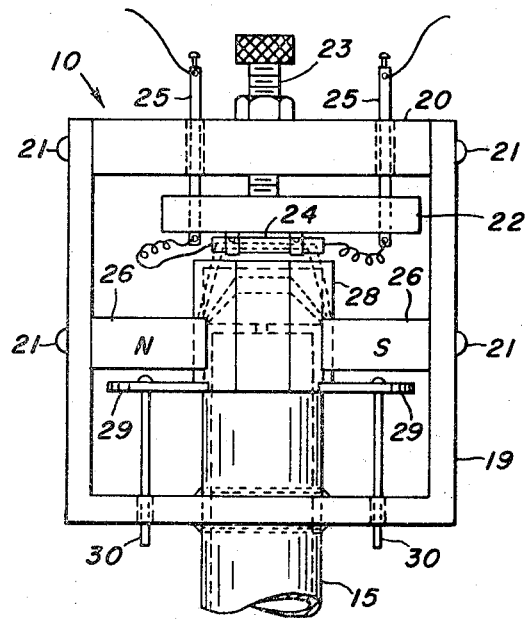

An inverted light weight cup 28 having laterally extending ears 29 (see FIGS. 1 and 3) fits loosely over the upper end of pipe 15 and is designed so it will be lifted slightly from its position of rest thereon by the flow of fluid through the pipe and out of port 17. Parallel guidepins 30 extend downwardly from ears 29 through holes in the bottom portion of frame 19. As shown in FIG. 3, the cylindrical wall of cup 28 is composed of four segments, two, 31 of nonmagnetic material such as brass and two, 32 of magnetic material such as iron. By virtue of this construction, when cup 28 is in its normal or lower position, the most direct path for the magnetic field is straight across through the upper end of pipe 15 as shown by dotted lines in FIG. 4. This condition leaves switch 24 unaffected, i.e., open.

when fluid flow occurs through pipe 15 and out of port 17, cup 28 is lifted by the force, pneumatic or hydraulic, of the fluid flow, to the position shown in FIG. 5. This has the effect of shifting the path of the flux between pole pieces 26 to the position shown in dotted lines in FIG. 5. This position is close enough to switch 24 to cause operation, i.e., closing thereof since it is by construction, responsive to the near presence of a magnetic field.

The terminals of switch 24 are connected to pins 25 and brought out thence to terminal posts 33 screwed into bushings of electrical insulation threaded into top plate 12. The switch may thus be connected in any desired control circuit which is to be closed on the occurence of fluid flow through pipe 15.

It will be evident that our invention has several advantages. It is sensitive to small forces and is therefore useful in detecting small volumes of flow at low pressures. The responsiveness may be adjusted by screw 23. The switch proper is totally enclosed and protected from contact with the fluid to be detected. The actuating mechanism is self-operating in direct response to the flow of fluid so the operating time is minimal.

We claim:

1. A flow-responsive device comprising a standpipe disposed generally vertically, an inverted cup reciprocably disposed over the upper end of said pipe, means for letting said cup by the force of fluid flowing therethrough, means establishing a field of magnetic flux transversely through the cup and upper end of said pipe said cup including means effective when lifted to shift the path of said flux, and a switch mounted above said cup and responsive to said shift in the flux path so as to be operated thereby.

2. An apparatus as defined in claim 1, characterized by a supporting frame mounted on said standpipe, and guide means on said cup reciprocable in said frame.

3. An apparatus as defined in claim 2, characterized by said flux-establishing means being mounted on said frame.

4. An apparatus as defined in claim 1, characterized by means for adjusting the position of said switch on said frame relative to said cup.

5. An apparatus as defined in claim 1, characterized by a blank end closing the upper end of the pipe length, said blank end having a fluid outlet port therein.

6. An apparatus as defined in claim 1, characterized by said flux-establishing means including spaced pole pieces on opposite sides of said cup.

7. An apparatus as defined in claim 1, characterized by said frame being of U-shape, said standpipe extending through the horizontal portion thereof.